Sept. 20, 1938.   J. H. BELKNAP   2,130,832
EMERGENCY STOP-AND-REVERSE MOTOR CONTROL
Filed April 24, 1937
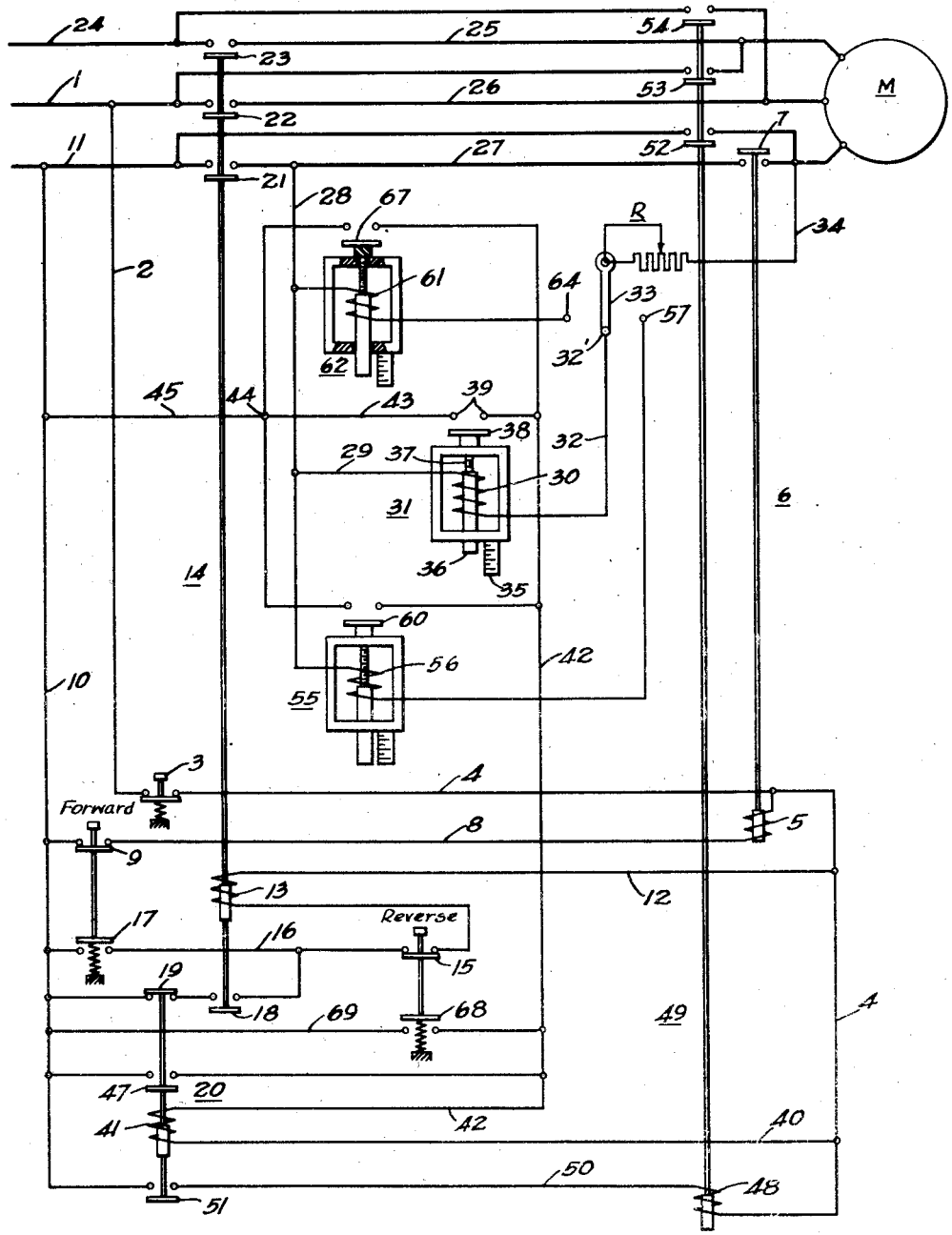
WITNESSES:
INVENTOR
John H. Belknap.
BY
ATTORNEY Patented Sept. 20, 1938

2,130,832

UNITED STATES PATENT OFFICE 2,130,832

EMERGENCY STOP-AND-REVERSE MOTOR CONTROL

John H. Belknap, Wilkinsburg, Pa., assignor to Westinghouse Electric & Manufacturing Company, East Pittsburgh, Pa., a corporation of Pennsylvania Application April 24, 1937, Serial No. 138,793

18 Claims. (Cl. 172—179)

My invention relates to a system of control for electric motors, and more particularly to a system of control for controlling the stopping and reversing of a motor driven machine.

My invention has particular utility with pipe threading machines adapted to thread pipe of different diameters and consisting of different materials. For instance, a cast brass pipe of a given diameter and thickness of the material would crush more easily than a malleable iron pipe of the same dimensions yet with my system of control both the motor and the threading machine are protected in the event the pipe being threaded is crushed.

One object of my invention is to provide for automatically stopping and reversing the operation of a motor when the motor is subjected to a selected load.

A further object of my invention is to provide for controlling the stopping and reversing of an electric motor in response to any one of a plurality of torques delivered by the motor.

A still further and more specific object of my invention is to effect the automatic stopping and reversing of a motor in response to any selected one of a plurality of armature currents of the motor.

Other objects and advantages of my invention, not specifically recited, will become apparent from a study of the following specification when considered in conjunction with the accompanying drawing, in which, the single figure is a diagrammatic showing of my system of control as applied to an induction motor.

My invention is, however, not limited to an induction motor but is applicable to any electric motor.

The motor, generally designated by the reference character M, is coupled to a machine, not shown, that is not to be overloaded. To facilitate the disclosure of my invention, the motor M may be considered as coupled to a pipe threading machine. If such machine becomes overloaded, the threads to be cut may be defective or the pipe becomes crushed which is more serious and is more likely to happen.

One still other object of my invention is, therefore, to prevent injured or defective production units of a machine coupled to a motor.

The motor M is disposed to be connected to the alternating current buses 1, 11, and 24 by the forward line switch 14. The motor M may also be connected for reverse operation through reverse line switch 49.

To properly and automatically reverse the motor in the event of an overload of a selected value, I provide the load-trip relays, or control switches, 31, 55, 62, etc., which control switches may be selectively interconnected with the armature of the motor M and in operation automatically cause the opening of the forward line switch 14 and the closing of the reverse line switch 49.

The load-trip relays 31, 55, and 62 are merely illustrative, as far as the number of the relays used is concerned, of my control and indicate that the motor M may be automatically stopped and reversed when the machine coupled to the motor is operating on any one of three different sizes of pipe. In practice, the number of relays may be considerably greater than three, so that pipes of different sizes, as well as pipes of different materials, may be properly threaded without injury to the pipes or the machine or both.

A description of one of the load-trip relays will suffice to illustrate the operation of the others. Load-trip relay 31 shows a closed magnetic circuit. The switch is provided with a movable armature 36. An actuating coil 30 is mounted in fixed relation to the magnetic circuit and when energized to a selected magnitude, moves the armature substantially along the axis of the coil to actuate a contact bridging member 38. The contact bridging element is mounted on a block of insulation, which block is provided with a threaded stem 37 of non-magnetic material so that the armature may be adjusted relative to the coil 30. The position to which the armature 36 is adjusted may be readily observed by the position of the lower end of the armature with reference to the graduated scale 35 rigidly attached to the magnetic structure.

The adjustment of the armature is supplemented by further adjustments that may be made in the number of turns in the coil surrounding the armature. In practice, each relay is designed to take care of pipe sizes within a given range; however, since the materials may differ and pipe sizes also differ by small increments, each relay is adjusted by shifting its armature, but, if necessary, is also adjusted by adjusting the effect of rheostat R. Adjustment of rheostat R changes the ampere turns of the particular relay selected.

The selection of the relays is done by the dial switch 33. The arm of this dial switch may be shifted to any one of the contact fingers 32', 57, 64, etc. The control is such that the motor may be caused to stop and then reverse at any selected torque of the motor over the entire operating range of the machine that may be coupled to the motor.

A still better understanding of my invention can be had from a study of a typical operation. If the shop man wishes to thread pipe of a given diameter, he operates the dial switch to select any one of the relays 31, 55, 62, etc., i. e., and he selects the particular relay designed for operation at a given motor torque.

Assuming the selection is made as shown, namely, relay 31 is selected and also assuming that buses 1, 11 and 24 are energized, then a circuit is established from bus 1 through conductor 2, stop switch 3, conductor 4, actuating coil 5 of the control relay 8, conductor 6, back contact member 9 of the forward starting switch, and conductor 10 to the bus 11. The control relay opens the contact members 7.

If the operation of motor M is to be effected, the attendant depresses the forward starting switch. This operation opens the circuit for actuating coil 5 and also closes the contact members 17, whereby a circuit is established from the energized conductor 4 through conductor 12, actuating coil 13 of the forward line contactor 14, the back contact members 15 of the reverse starting switch, conductor 16, contact members 17 to the energized conductor 10.

Operation of the forward line contactor 14 causes the closing of contact members 18 to establish a holding circuit for coil 13 through the contact members 18 and 19, and also causes the closing of contact members 21, 22, and 23 to thus connect the motor to buses 1, 11, and 24 through conductors 25, 26, and 27 and contact members 7 in series with conductor 27. Since contact members 7 are closed as long as the forward starting switch is held depressed, it is apparent that no coil of any of the load-trip relays is energized during starting by the starting current regardless of the position of the arm of the dial switch 33. As soon as the motor M is up to speed, the forward starting switch is released to close contact members 9. This operation reenergizes the coil 5 to open contact members 7.

After contact members 7 are opened, the load current in one of the leads to the motor passes from conductor 27 through conductors 28 and 29 through coil 30 of the load-trip relay 31, conductor 32, contact finger 32', the arm of the dial switch 33, rheostat R and conductor 34 to the motor.

The selection of a given load-trip relay, as 31, may not of itself give sufficiently accurate control to protect the material being operated upon even though within the size range for which relay 31 is designed. The preferable procedure, therefore, is to let motor M, through its machine, operate on a sample and while operating on the sample and by a trial and error method adjust the position of the armature 36 and the resistance value of rheostat R until the load-trip relay operates when the load on the motor is just a trifle less than the load that would crush the piece operated upon. During regular operation, no damaged units are produced and the pipe is not crushed. The starting of the motor is, of course, the same for adjusting the load-trip relay as for the starting after the load-trip relay is properly adjusted.

If no unusual load is encountered, the load-trip relay does not operate and as a result the motor continues to operate in a forward direction until the attendant depresses the reverse starting switch to open the contact members 15 and close the contact members 68.

Opening of contact members 15 causes the opening of the forward line contactor 14 and the closing of contact members 68 causes the closing of the reverse line contactor 49. The circuit for the reverse line contactor is established as follows: Closing of contact members 68 establishes a circuit from energized conductor 4 through conductor 40, actuating coil 41 of the set-up relay 20, conductor 42, contact members 68 and conductor 69 to the energized conductor 10; the operation of the set-up relay 20 provides its own holding circuit through contact members 47; and set-up relay 20 establishes a circuit from the energized conductor 4 through actuating coil 48 of reverse line contactor 49, conductor 50 and contact members 51, now closed, to the energized conductor 10.

The operation discussed in the preceding paragraph is the operation of my system of control when no special protective control is needed. That is, the attendant may operate the motor M in a forward direction and then in a reverse direction as desired. However, in the event the motor M becomes overloaded, and there is danger of crushing the pipe being supplied with threads or the pipe has actually been crushed, depending on the adjustment of the load-trip relay used, the load-trip relay operates to move its contact bridging members, as 38, if the load-trip relay 31 is used, to establish a circuit from the energized conductor 4 through conductor 40, actuating coil 41 of the set-up relay 20, conductor 42, contact fingers 39 bridged by the member 38, conductor 43, junction 44 and conductor 45 to energized conductor 10. It will be noted that even though the reverse starting switch is not actuated, a circuit is established for the set-up relay 20, which set-up relay causes the closing of contact members 51 to thus energize the actuating coil 48 of the reverse line contactor 49 to close the contact members 52, 53, and 54, and at the same time that this reverse line contactor is closed, the forward line contactor is opened by reason of the fact that the circuit for coil 13 is opened at the contact members 19. The motor M is, therefore, not only immediately stopped in the event of an overload, but is caused to operate in the reverse direction and continues to operate in such reverse direction until the attendant operates the stop switch 3.

If the dial switch is adjusted to make contact with the contact finger 64, the motor will be similarly operated. However, in this instance the circuit for coil 41 will be established through contact members 67 when the load-trip relay 62 is caused to operate through the energization of its actuating coil 61. Similarly, if the dial switch 33 is adjusted to make contact with the contact finger 57, an overload on the motor will cause the energization of the coil 56 and thus cause the establishment of a circuit for the coil 41 through the contact members 60.

I am, of course, aware that others, particularly after having had the benefit of the teachings of my invention, might design other circuit diagrams for accomplishing the novel results accomplished by my system of control. I, therefore, do not wish to be limited to the specific control system I have shown, but wish to be limited only by the scope of the appended claims and such prior art as may be pertinent.

I claim as my invention:

1. In a system of control for electric motors, in combination, a motor, a source of electric current, means adapted to connect said motor to said source of electric energy for one direction of operation, means adapted to connect said motor to said source of electric energy for another direction of operation, and means responsive to a selected load current of said motor adapted to disconnect the motor from said source of electric energy when connected for one direction of operation and to connect said motor to said source of electric energy to cause it to operate in another direction.

2. In a system of control for electric motors, in combination, a motor, a source of electric energy, connecting leads connecting the motor to said source of energy, a load-trip relay having a coil adapted to be connected in one of the leads interconnecting the motor with said source of electric energy and having means for adjusting the effect of the current in said coil so that said load-trip relay may be caused to operate at any one of a number of load currents of said motor, and means responsive to the operation of said load-trip relay adapted to reverse the leads connecting the motor to said source of energy to thus reverse the operation of the motor.

3. In a system of control for electric motors, in combination, a motor, a source of electric energy, and means responsive to the load current of the motor adapted to effect a plugging operation of the motor.

4. In a system of control for electric motors, in combination, a motor, switching means adapted to connect said motor for either forward or reverse operation, and means responsive to the load current of the motor adapted to reverse the interconnection of said motor with said source of electric energy.

5. In a system of control for electric motors, in combination, a motor, a plurality of torque devices responsive to selected motor torques, selecting means for selectively interconnecting any one of said devices with said motor, a source of electric energy, means adapted to connect said source of electric energy to said motor so as to include the torque device selected in said connection, and means responsive to the torque device selected adapted to change the connection of said motor to said source of energy.

6. In a system of control for electric motors, in combination, a motor, a plurality of torque devices responsive to selected motor torques, selecting means for selectively interconnecting any one of said devices with said motor, means for adjusting the said devices so that the one selected may be made responsive to a specific motor torque, a source of electric energy, means adapted to connect said source of electric energy to said motor so as to include the torque device selected in said connection, and means responsive to the torque device selected adapted to change the connection of said motor to said source of energy.

7. In a system of control for electric motors, in combination, a motor; a source of energy; a load-trip relay having a magnetic circuit, a coil rigidly mounted on the magnetic circuit and energized by the motor current, a movable armature, switching means on said movable armature adapted to control the interconnection of said motor with said source of energy.

8. In a system of control for electric motors, in combination, a motor; a source of energy; a load-trip relay having a magnetic circuit, a coil rigidly mounted on the magnetic circuit and energized by the motor current, a movable armature, means for adjusting the movable armature in relation to the coil, switching means on said movable armature adapted to control the interconnection of said motor with said source of energy.

9. In a system of control for electric motors, in combination, a motor; a source of energy, a load-trip relay having a magnetic circuit, a coil rigidly mounted on the magnetic circuit and energized by the motor current, a movable armature, means for indicating the adjustment of the armature relative to the coil, switching means on said movable armature adapted to control the interconnection of said motor with said source of energy.

10. In a system of control for electric motors, in combination, a motor; a source of energy; a load-trip relay having a magnetic circuit, a coil rigidly mounted on the magnetic circuit and energized by the motor current, a movable armature, means for adjusting the resistance value of the coil circuit, switching means on said movable armature adapted to control the interconnection of said motor with said source of energy.

11. In a system of control for electric motors, in combination, a motor; a source of electric energy; switching means adapted to connect said motor to said source of energy for one direction of operation; switching means adapted to connect said motor to said source of energy for another direction of operation; a load-trip relay having a magnetic circuit, a coil mounted in fixed relation to said magnetic circuit and adapted to magnetize the same, a movable armature, and means responsive to the operation of the armature of the load-trip relay adapted to effect the opening of the circuit that may be established by the first named switching means and effect the closing of the circuit that may be established by the second switching means.

12. In a system of control for electric motors, in combination, a motor; a source of electric energy; switching means adapted to connect said motor to said source of energy for one direction of operation; switching means adapted to connect said motor to said source of energy for another direction of operation; a load-trip relay having a magnetic circuit, a coil mounted in fixed relation to said magnetic circuit and adapted to magnetize the same, a movable armature, means for adjusting the movable armature in relation to the coil, and means responsive to the operation of the armature of the load-trip relay adapted to effect the opening of the circuit that may be established by the first named switching means and effect the closing of the circuit that may be established by the second switching means.

13. In a system of control for electric motors, in combination, a motor; a source of electric energy; switching means adapted to connect said motor to said source of energy for one direction of operation; switching means adapted to connect said motor to said source of energy for another direction of operation; a load-trip relay having a magnetic circuit, a coil mounted in fixed relation to said magnetic circuit and adapted to magnetize the same, a movable armature, means for indicating the adjustment of the armature relative to the coil, and means responsive to the operation of the armature of the load-trip relay adapted to effect the opening of the circuit that may be established by the first named switching means and effect the closing of the circuit that may be established by the second switching means.

14. In a system of control for electric motors, in combination, a motor; a source of electric energy; switching means adapted to connect said motor to said source of energy for one direction of operation; switching means adapted to connect said motor to said source of energy for another direction of operation; a load-trip relay having a magnetic circuit, a coil mounted in fixed relation to said magnetic circuit and adapted to magnetize the same, a movable armature, means for adjusting the resistance value of the coil circuit, and means responsive to the operation of the armature of the load-trip relay adapted to effect the opening of the circuit that may be established by the first named switching means and effect the closing of the circuit that may be established by the second switching means.

15. In a system of control for electric motors, in combination, a motor; a source of electric energy; switching means adapted to interconnect said motor for either direction of operation; a load-trip relay having a magnetic circuit, a coil mounted in fixed relation to said magnetic circuit adapted to magnetize the same in proportion to the load current of said motor, a movable armature; and means responsive to the operation of the armature of said load-trip relay adapted to control said switching means to effect plugging of said motor.

16. In a system of control for electric motors, in combination, a motor; a source of electric energy; switching means adapted to interconnect said motor for either direction of operation; a load-trip relay having a magnetic circuit, a coil mounted in fixed relation to said magnetic circuit adapted to magnetize the same in proportion to the load current of said motor, a movable armature, means for adjusting the movable armature in relation to the coil; and means responsive to the operation of the armature of said load-trip relay adapted to control said switching means to effect plugging of said motor.

17. In a system of control for electric motors, in combination, a motor; a source of electric energy; switching means adapted to interconnect said motor for either direction of operation; a load-trip relay having a magnetic circuit, a coil mounted in fixed relation to said magnetic circuit adapted to magnetize the same in proportion to the load current of said motor, a movable armature, means for indicating the adjustment of the armature relative to the coil; and means responsive to the operation of the armature of said load-trip relay adapted to control said switching means to effect plugging of said motor.

18. In a system of control for electric motors, in combination, a motor; a source of electric energy; switching means adapted to interconnect said motor for either direction of operation; a load-trip relay having a magnetic circuit, a coil mounted in fixed relation to said magnetic circuit adapted to magnetize the same in proportion to the load current of said motor, a movable armature, means for adjusting the resistance value of the coil circuit; and means responsive to the operation of the armature of said load-trip relay adapted to control said switching means to effect plugging of said motor.

JOHN H. BELKNAP.